United States Patent [19]
Van Haren

[11] Patent Number: 5,275,095
[45] Date of Patent: Jan. 4, 1994

[54] BRINE INJECTION DEVICE

[75] Inventor: Lambertus Franciscus W. Van Haren, Druten, Netherlands

[73] Assignee: Stork Protecon B.V., Oss, Netherlands

[21] Appl. No.: 959,914

[22] Filed: Oct. 14, 1992

[30] Foreign Application Priority Data

Oct. 16, 1991 [NL] Netherlands ................. 9101728

[51] Int. Cl.⁵ .................. A22C 9/00; A23C 17/00; A23L 1/31; A23L 3/34
[52] U.S. Cl. ......................... 99/533; 99/487; 99/535
[58] Field of Search .......... 99/486, 487, 516, 532–535; 426/281, 652, 231; 74/867, 866

[56] References Cited

U.S. PATENT DOCUMENTS

| | | |
|---|---|---|
| 1,679,264 | 7/1928 | Parker . |
| 3,922,357 | 11/1975 | Townsend ................ 426/281 |
| 4,142,000 | 2/1979 | Townsend ................ 426/281 |
| 4,254,151 | 3/1981 | Townsend ................ 426/231 |
| 4,286,510 | 9/1981 | Prosenbauer ............... 99/533 |
| 5,042,370 | 8/1991 | Trijssenaar ............... 99/533 X |
| 5,071,666 | 12/1991 | Handel et al. ............ 99/487 X |
| 5,142,971 | 9/1992 | Norrie ....................... 99/487 |

FOREIGN PATENT DOCUMENTS

| | | |
|---|---|---|
| 0191712 | 8/1986 | European Pat. Off. . |
| 2703435 | 8/1977 | Fed. Rep. of Germany . |
| 807469 | 1/1937 | France . |
| 1164021 | 9/1969 | United Kingdom . |
| 2127274 | 4/1984 | United Kingdom ............ 99/532 |
| 8302547 | 8/1983 | World Int. Prop. O. ........ 99/533 |
| 8803758 | 6/1988 | World Int. Prop. O. . |
| 8808095 | 10/1988 | World Int. Prop. O. . |

OTHER PUBLICATIONS

"Mechanisms Geared Linkages", Engineering, vol. 218, No. 9, Sep. 1978, pp. 880–884.
Derwent Publications Ltd., World patents Index, AN=86-040520[06], No. SUA1139567, Feb. 25, 1985.

*Primary Examiner*—Timothy F. Simone
*Attorney, Agent, or Firm*—Wegner, Cantor, Mueller & Player

[57] ABSTRACT

A device for injecting food products with a liquid, includes a support for the food pieces, a needle carrier placed above the support and movable in a vertical direction, injection needles fixed to the needle carrier and extending downward, feed means for supplying the liquid to each of the injection needles and at least one drive mechanism for driving the needle carrier in the vertical direction. In order to obtain uniform distribution of the liquid in the food pieces, the drive mechanism, which converts a rotational drive into a linear movement, has a number of freely selectable variables so that during the downward stroke the speed of the needle carrier is a constant as possible. This is achieved by equipping the drive mechanism with a planetary gear wheel system. Preferably, the planetary gear wheel system includes a sun-wheel and a planet wheel which have the same diameter and the same number of teeth.

15 Claims, 4 Drawing Sheets

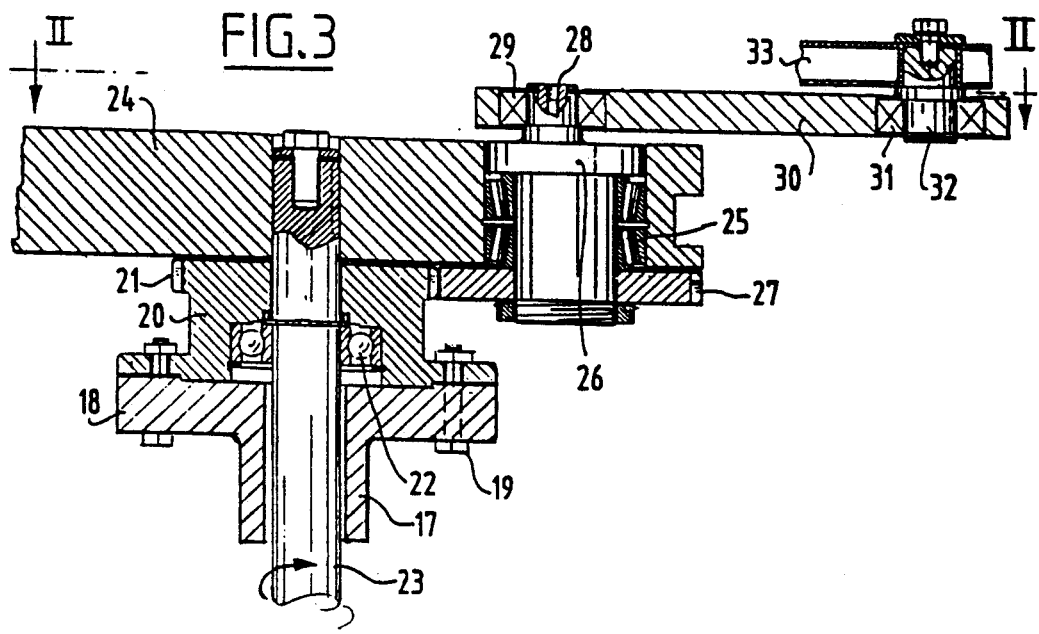
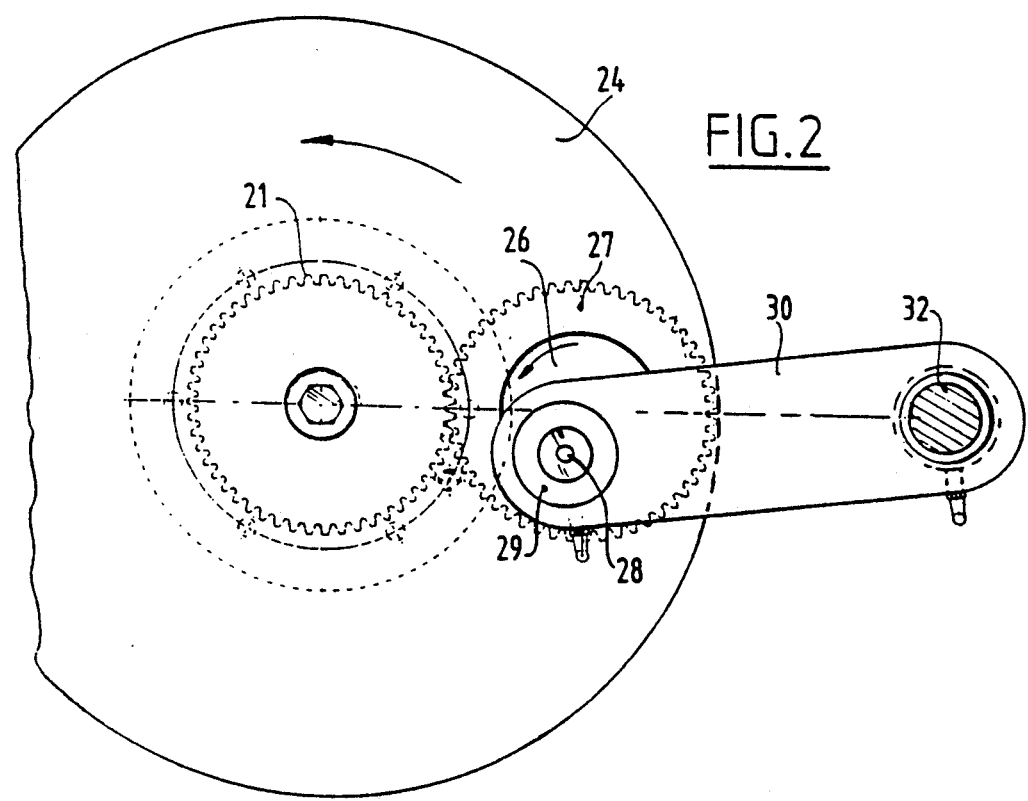

BRINE INJECTION DEVICE

BACKGROUND OF THE INVENTION

The present invention relates to a device for injecting food products, for instance pieces of meat, with a liquid, comprising:
- a holder for the pieces of meat for injecting;
- a needle carrier placed in the vicinity of the holder and movable in the direction towards the holder;
- injection needles fixed to the needle carrier and extending towards the holder;
- feed means for supplying the liquid for injecting to each of the injection needles; and
- at least one drive mechanism for driving the needle carrier in its moving direction.

Such devices are generally known.

The drive mechanism of such known devices is generally formed by a crankshaft mechanism, from which it follows that the movement of the needle carrier in vertical direction is virtually a sinuoid movement.

Such a drive device is of course quite simple, but the sinuoid movement resulting therefrom has the drawback that the distribution of the liquid for injecting in the meat is not uniform in the vertical direction as a consequence of the sinusoid movement.

SUMMARY OF THE INVENTION

The object of the present invention is to provide such a device which can be manufactured at a low cost price, wherein during the downward movement of the needles in which the injection takes place the speed of the injection needles is kept as constant as possible.

This objective is achieved in that the drive mechanism comprises a planetary gear wheel system.

A planetary gear wheel system is understood to comprise a group of gear wheel mutually engaging at least partially, and the center of at least one gear wheels being movable relative to the other gear wheels. One of the gear wheels could be composed of an internally toothed ring.

As a result of the fact that the drive mechanism comprises such a planetary gear wheel system, so many degrees of freedom are created for determining the movement that it is possible to cause the downward stroke of the needles to be performed at the most uniform possible speed.

Such an injection device is otherwise known from EP-A-0191712, wherein a practically constant movement is likewise obtained in downward direction, but which comprises a drive system provided with a cam and a cam disc.

This known device has the drawback however that the cam disc is not particularly suitable for absorbing great forces, so that in this known device the operational speed is limited. This known device is moreover subject to a considerable degree of wear.

In the device according to the present invention this is not the case.

BRIEF DESCRIPTION OF THE DRAWINGS

The present invention will subsequently be elucidated with reference to the annexed drawings, in which:

FIG. 2 shows a side view of a single drive device according to the invention;

FIG. 3 is a sectional view of the drive device depicted in FIG. 2;

DESCRIPTION OF THE PREFERRED EMBODIMENTS

Figure 1:
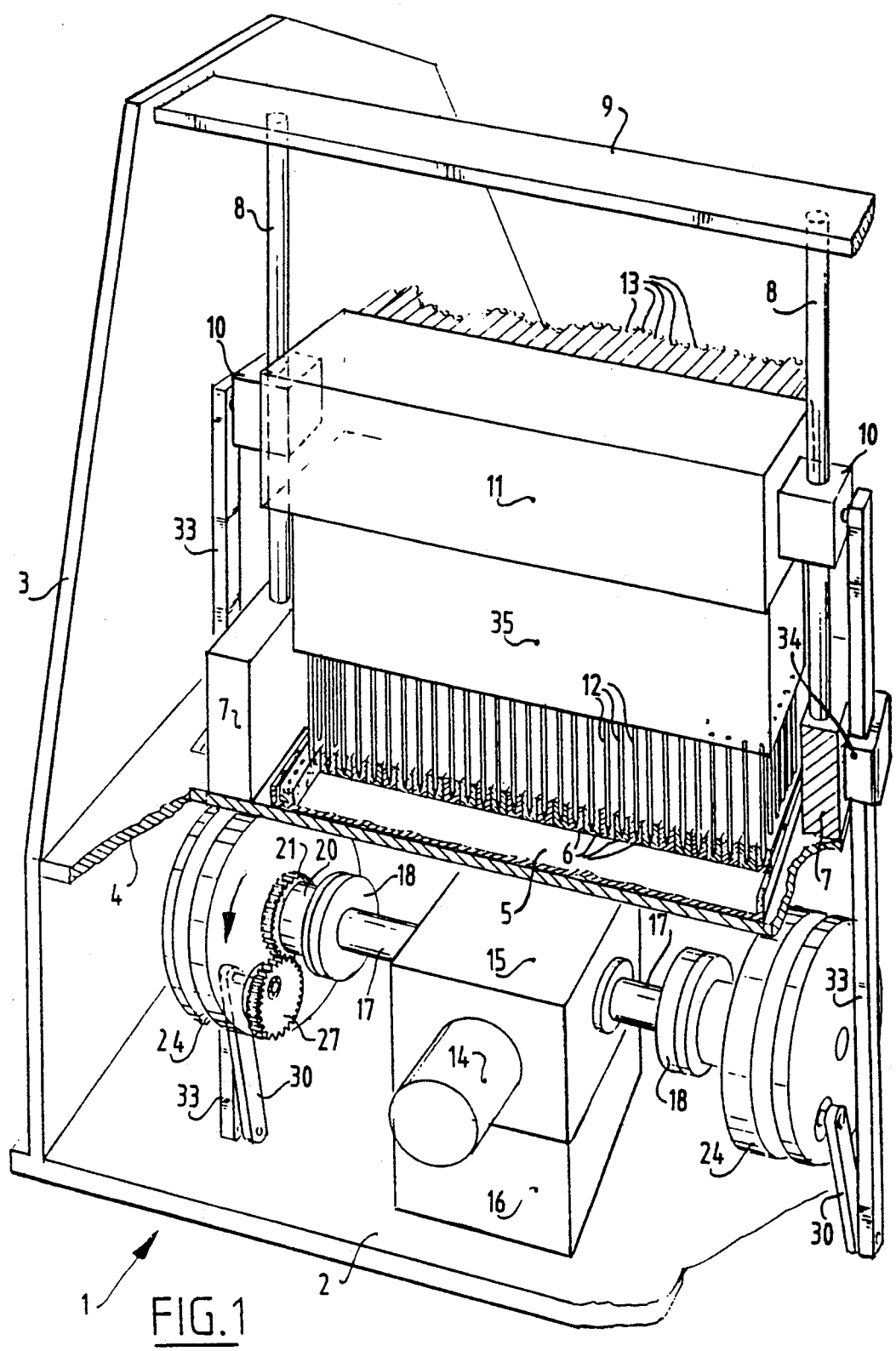
FIG. 1 shows a perspective partly broken away view of an injecting device according to the invention.

The injecting device 1 shown in FIG. 1 is formed by a base plate 2 on which are arranged two side plates 3, only one of which is shown. At a distance from the base plate 2 both side plates 3 are joined by a support plate 4. Arranged above the support plate 4 is a conveyor belt 5 with which the pieces of meat 6 for injecting are supplied.

It is of course possible to have the return path of the conveyor belt run through below the plate 5. It is possible to use other conveying mechanisms instead of the conveyor belt 5, but it is also possible to place the pieces of meat by hand.

Arranged on the support plate 4 are two side pieces 7, on each of which is fixed a rod 8. The side pieces 7 serve to guide the conveyor belt, while the rods 8, which are mutually connected at their top by a connecting strip 9 and which are also connected to the side plates 3, serve to guide the guide blocks 10. These latter are movable in vertical direction.

Both guide blocks 10 are connected by a needle carrier 11. A large number of needles 12 ordered in a matrix are attached to the needle carrier 11.

A similarly large number of feed hoses 13 is arranged for supplying injection liquid to the needles. The hoses 13 are fed by a pump, not shown in the drawing, for supplying injection liquid. This injection liquid will generally be formed by brine.

Arranged below the needle carrier 11 is a beam-like closing means 35 which normally closes the feed of injection liquid to the needles and only allows the injection liquid to pass to the needles when in contact with the meat for injecting. Thus is achieved that the needles only inject into the meat.

In order to move the needle carrier in vertical direction a drive device is arranged on the base plate 2 but under the support plate 3, which device is formed by an electric motor 14 which is fixed onto a gearbox 15. The gearbox 15 rests on the base plate 2 by means of a console 16.

The drive device will be discussed more precisely hereinafter, also with reference to FIG. 2 and 3.

Fixed against both sides of the gearbox 15 is a hollow shaft 17 which is closed at its end by a flange 18. Fastened against the flange 18 by means of a bolt connection 19 is a sleeve 20 which is provided on one side with a toothing 21. This toothing 21 forms the sun-wheel. Further arranged in sleeve 20 is a bearing 22 in which is mounted the drive shaft 23 extending concentrically of the hollow shaft 17.

A disc 24 is fastened onto the drive shaft, which extends beyond the sleeve 20. Mounted in the disc 24 by means of a bearing 25 is a sleeve 26, to which is fixed a gear wheel 27. The latter is in engagement with the toothing 21 and also forms a planet gear wheel of the planetary gear wheel system.

Fixed onto the sleeve 26 concentrically relative to the shaft is the shaft end part 28. A connecting rod 30 is fixed onto this shaft end part by means of a bearing 29.

Mounted in the other end of the connecting rod 30 by means of a bearing 31 is a shaft end part 32 which is fixedly connected to a driving rod 33. The driving rod 33 is fixedly connected to the guide block 10. A guide 34 is arranged on the side piece 7 to guide the connecting rod 30. The connecting rod 30 can thus move only in vertical direction.

The operation of the above described device will be described hereinbelow.

When both drive shafts 23 are driven by means of the electric motor 14, the drive shaft 23 of each drive device will cause the disc 24 to rotate. As a result the gear wheel 27 will be carried along in rotation and, due to engagement in the stationary toothing 21, will also rotate about its own axis. The sleeve 26 thus performs a compound, cycloid movement.

The shaft end part 28 which is preferably, although not necessarily, placed concentrically on the sleeve will thus also execute a cycloid movement. This compound movement is transmitted to the connecting rod 30, and therewith to the driving rod 33, so that both guide blocks 10 are thus driven in vertical direction.

Because this construction has a large number of selectable variables, it becomes possible to make the guide blocks 10, and therefore the needles 12, execute a vertical movement such that during the downward stroke the movement is practically constant. It is then also possible to perform the return stroke as rapidly as possible to thus cause time loss and loss of injection liquid to be as small as possible.

It will be apparent that such a mechanism comprises a large number of degrees of freedom; it is for instance possible to alter the ratios between the numbers of teeth on both gear wheels, it is possible to vary the angular position of the shaft end part 28 on the sleeve 26 and it is possible to arrange the one gear wheel in shifted position.

Figure 4:
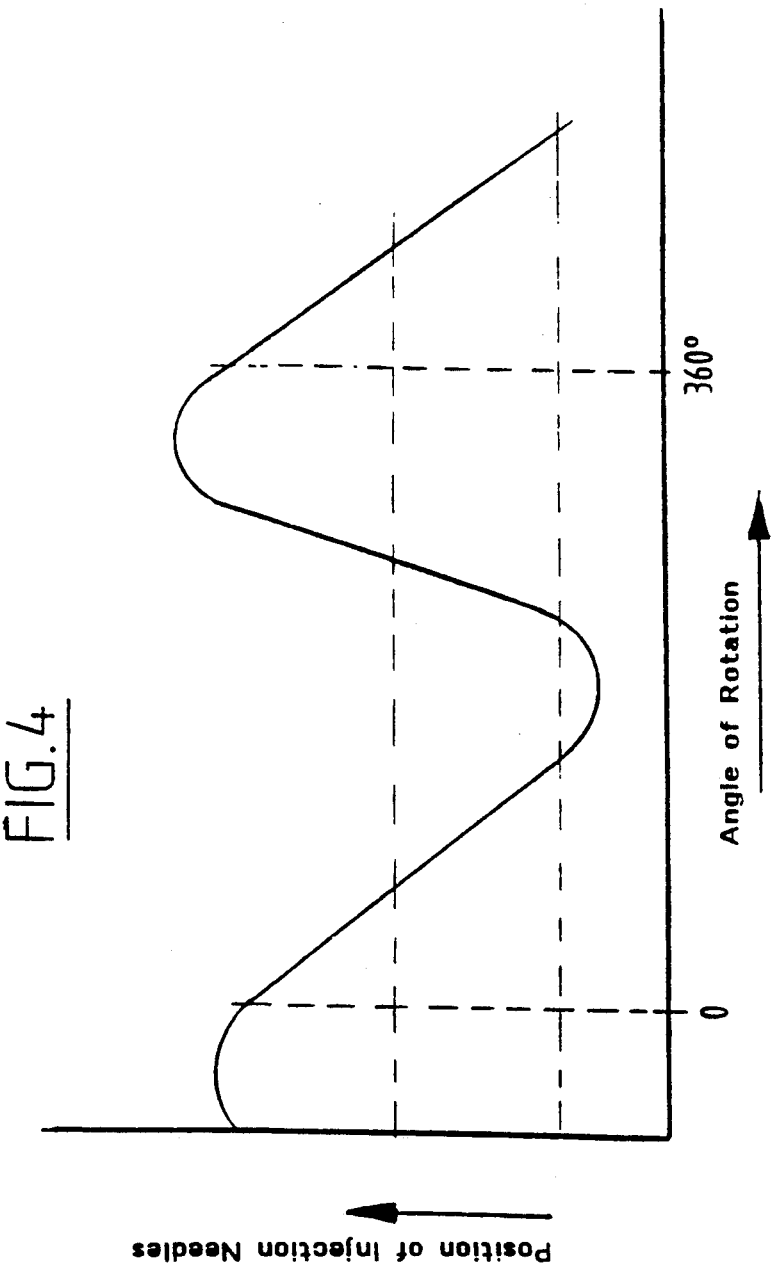
FIG. 4 shows a graph representing the movement of the needle carrier in vertical direction as a function of the angle of rotation of the drive shaft.

Each change results in a different movement, thus resulting in a large number of degrees of freedom. In the graph of FIG. 4 is shown an example of such a movement.

It can be seen from the graph that during the downward movement the speed is practically constant, while during the upward movement the speed is as great as possible.

It can also be seen from the graph that the injection needles extend into the meat only during part of the stroke. The possibility therefore exists of varying the thickness of the pieces of meat for injecting; the thickness may in any case not be so great that the needles are not released in their highest point. It is also important that the needles do reach the lower edge of the meat and in the lowest position possibly extend through the meat, although the time duration within which this occurs must be as small as possible to be able to execute the injection process in a time as short as possible and to prevent loss of injection liquid in some situations, when for instance no separate value has been provided. In order to provide space for the needles the support is therefore perforated.

Figure 5:
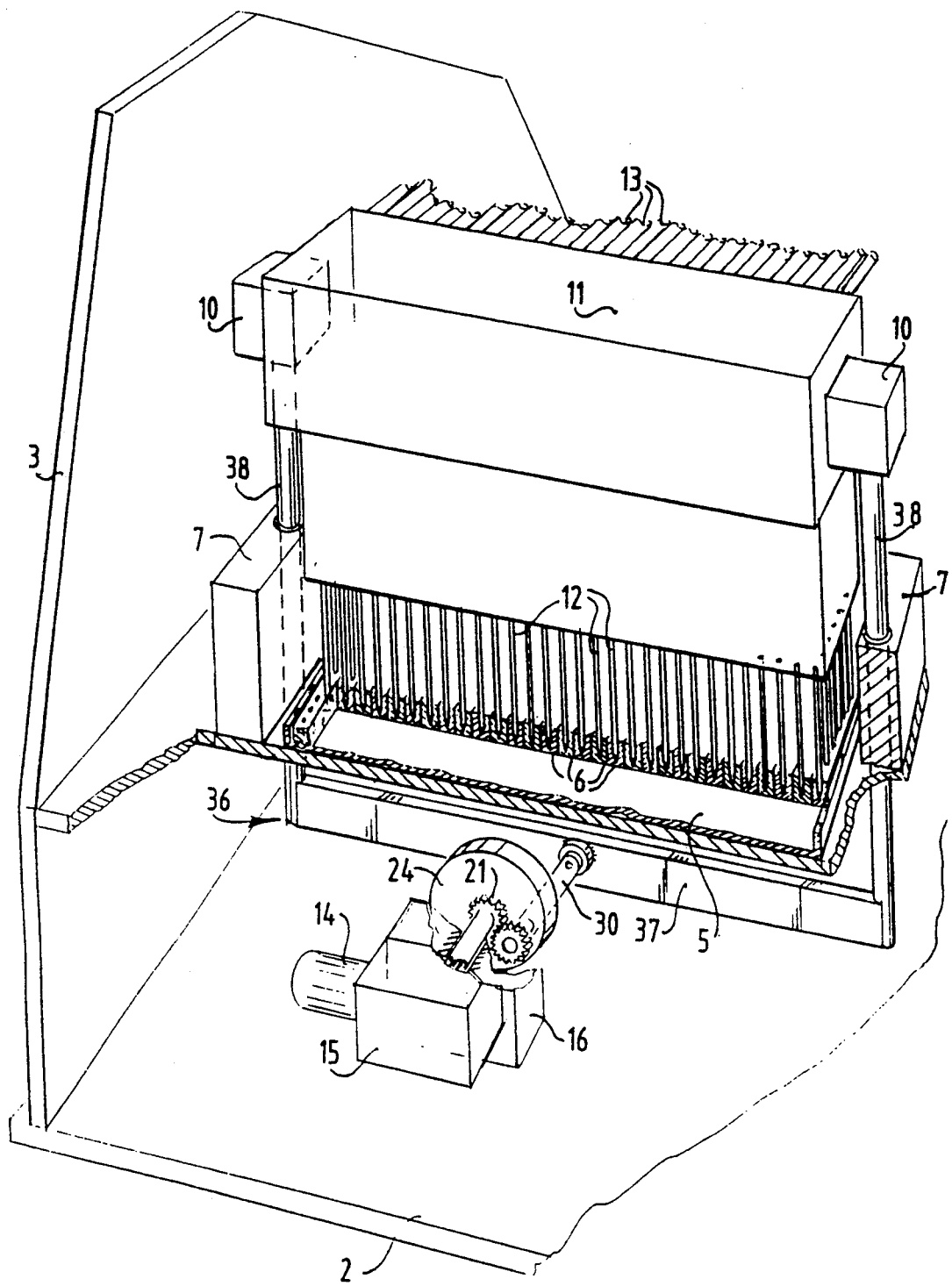
FIG. 5 is a schematic perspective view of a second embodiment of the invention.

Finally, FIG. 5 shows an alternative embodiment of the invention. In this embodiment there is only one transversely placed drive device, the connecting rod 30 of which is coupled to a yoke 36 which is formed by a plate 37 onto which the connecting rod 30 engages. The yoke further comprises two rods 38 which are connected to the needle carrier 11. The rods 38 are both guided through holes arranged in the side pieces 7. It is of course also possible to apply other types of guiding, for instance by rollers.

It will be apparent that diverse changes can be made to the construction without deviating from the invention.

I claim:

1. Device for injecting food products with a liquid, comprising:
   a holder for the food products;
   a needle carrier located in the vicinity of the holder;
   injection needles fixed to the needle carrier and extending towards the holder;
   feed means for supplying the liquid to each of the injection needles; and
   at least one drive mechanism for reciprocally driving the needle carrier towards and away from the holder along a direction substantially parallel to the injection needles, wherein the drive mechanism comprises a planetary gear wheel system, said planetary gear wheel system comprising first and second toothed wheels, said second toothed wheel being a planet wheel, and means for guiding the at least one toothed planet wheel such that the at least one planet wheel maintains engagement with the toothed wheel.

2. Device as claimed in claim 1, wherein the holder for food products is adapted to hold meat pieces.

3. Device as claimed in claim 2, wherein the first toothed wheel is a sun wheel.

4. Device as claimed in claim 1, wherein the at least one planet wheel is mounted on a carrier which is driven in rotation, the first toothed wheel is stationary, and one end of a connecting rod is mounted on a pin arranged on the at least one toothed planet wheel.

5. Device as claimed in claim 4, wherein the pin is arranged eccentrically on the at least one toothed planet wheel.

6. Device as claimed in claim 4, wherein the other end of the connecting rod is connected to a drive rod for driving the needle carrier in a vertical direction.

7. Device as claimed in claim 1, wherein the device comprises two drive mechanisms which are arranged on opposite sides of the needle carrier, each of said drive mechanisms further comprising a carrier.

8. Device as claimed in claim 7, wherein the carriers of each of the drive mechanisms are arranged on a common shaft.

9. Device as claimed in claim 4, wherein the other end of the connecting rod is connected to a yoke for driving the needle carrier in a vertical direction.

10. Device as claimed in claim 9, wherein the yoke further comprises two rods, said yoke extends around a support, said support having at least two sides, a lower part of the yoke is formed by a plate onto which the connecting rod is engaged, and each of the two rods of the yoke extend from different sides of the support.

11. Device as claimed in claim 10, wherein the drive mechanism further comprises a shaft which extends transversely from the yoke.

12. Device as claimed in claim 1, wherein the feed means are adapted for supplying the liquid to each of the needles at a constant pressure and at a fixed flow rate.

13. Device as claimed in claim 12, wherein closing means are arranged between the feed means and the injection needles, the closing means being open only when the needle carrier touches the food products.

14. Device as claimed in claim 1, wherein a support for the food products is formed by a transporting member intermittently movable in a horizontal direction.

15. Device as claimed in claim 3, wherein said sun-wheel and the at least one toothed planet wheel have the same diameter and the same number of teeth.

* * * * *